Ostwald et al. [15] 3,677,220
[45] July 18, 1972

[54] VOLUME INDICATOR FOR FLUID TANKS

[72] Inventors: Fritz Ostwald, Buchschlag; Siegfried Hertell, Kelsterbach, both of Germany

[73] Assignee: ITT Industries, Inc., New York, N.Y.

[22] Filed: June 5, 1970

[21] Appl. No.: 43,885

[30] Foreign Application Priority Data

June 6, 1969 Germany..................P 19 28 850.7

[52] U.S. Cl..................................116/118, 73/290, 73/299, 137/558
[51] Int. Cl..............................................G01f 23/00
[58] Field of Search..............116/70, 118; 73/290, 299, 419, 73/403, 453, 320, 451; 340/378; 137/403, 558

[56] References Cited

UNITED STATES PATENTS

| | | |
|---|---|---|
| 794,676 | 7/1905 | Martin....................................73/320 |
| 1,624,659 | 4/1927 | Eynon.....................................73/299 |
| 2,371,511 | 3/1945 | Faus.......................................340/378 |
| 2,764,645 | 9/1956 | Smith..................................137/558 X |
| 3,429,291 | 2/1969 | Hoffman...............................116/70 |
| 3,451,420 | 6/1969 | Bullivant..............................137/403 |
| 3,489,169 | 1/1970 | Stein.....................................137/403 |

*Primary Examiner*—Louis J. Capozi
*Attorney*—C. Cornell Remsen, Jr., Walter J. Baum, Paul W. Hemminger, Charles L. Johnson, Jr., Philip M. Bolton, Isidore Togut, Edward Goldberg and Menotti J. Lombardi, Jr.

[57] ABSTRACT

A fluid volume indicator for tanks having a follower, the position of which is directly proportional to the volume of the fluid in the tank and a visible indicator between the follower and a fixed wall, the indicator being movable along the axis of the follower and being acted upon by the two opposed helical compression springs, one between the indicator and the follower and the other one between the indicator and the fixed wall of the tank so that the movement of the indicator is proportional to the movement of the follower.

7 Claims, 3 Drawing Figures

Patented July 18, 1972
3,677,220
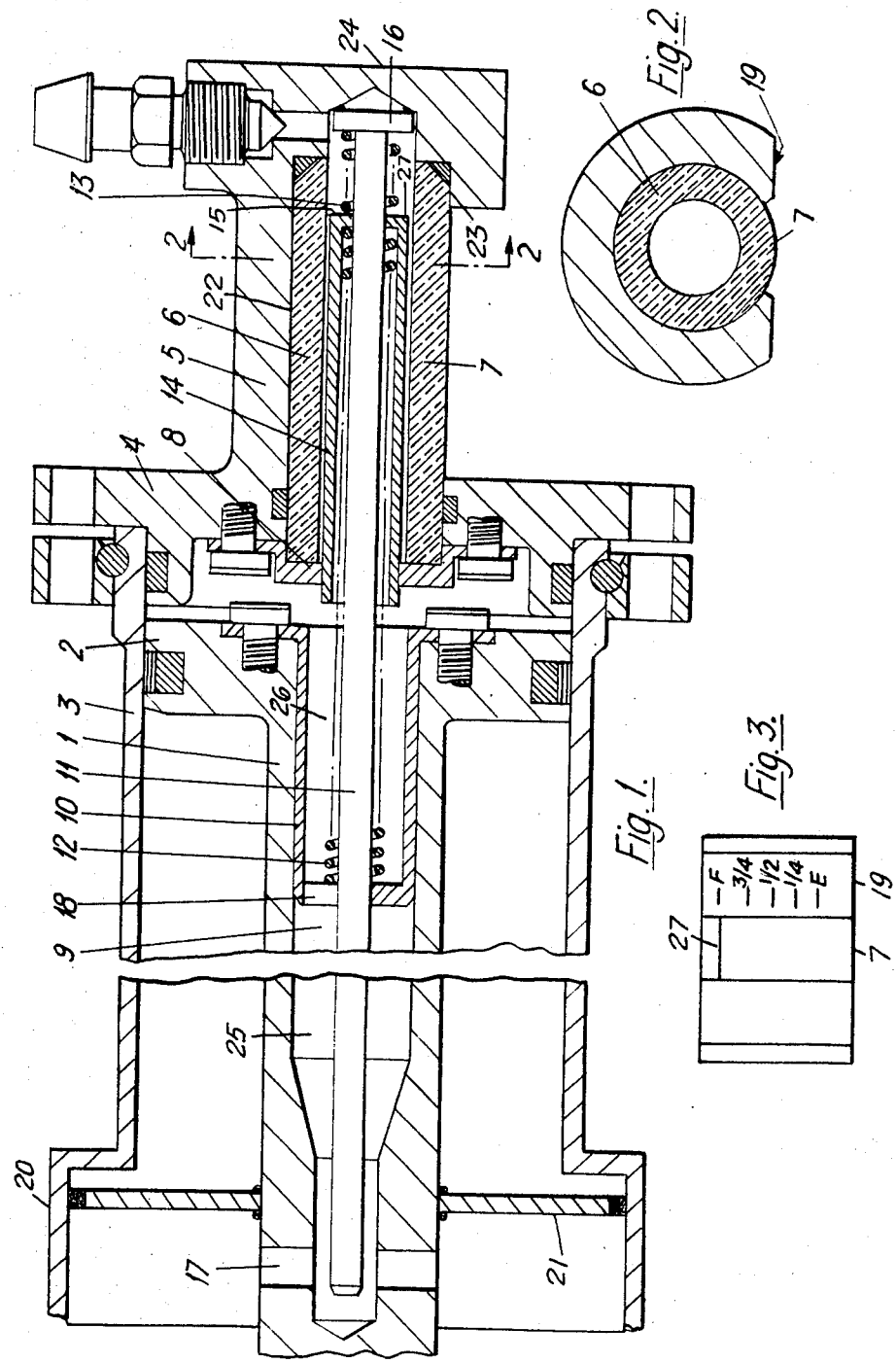
Inventors
FRITZ OSTWALD
SIEGFRIED HERTELL
By [signature]
Attorney

VOLUME INDICATOR FOR FLUID TANKS

BACKGROUND OF THE INVENTION

1. Field of the Invention

This invention relates to volume indicators for fluid tanks.

2. Description of Prior Art

There are a variety of devices available for externally indicating the amount of fluid within a tank. The tank may be either a gas pressure tank with a movable wall such as a piston or it may be a liquid tank in which case the indicating device measures the liquid level. The liquid level indicating devices usually have a float of some type which follows the liquid level with the movement of the float being mechanically transmitted to an external indicator. This type of construction is shown in U.S. Pat. Nos. 41,620, 794,676, and 2,371,511.

SUMMARY OF THE INVENTION

It is an object of the present invention to provide a volume indicator which may be adapted to either a liquid or gas tank to indicate the fluid volume within the tank.

It is a further object of this invention to provide a volume indicator for fluid tanks which is simple, reliable, lightweight, and which does not greatly increase the space required for the tank.

BRIEF DESCRIPTION OF THE DRAWINGS

FIG. 1 is a partial longitudinal sectional view of a volume indicator constructed in accordance with this invention.

FIG. 2 is a cross section taken along line 2—2 of FIG. 1 with the indicating sleeve and helical spring omitted for clarity.

FIG. 3 is an elevational view looking at slot 7 of FIG. 2.

DESCRIPTION OF THE PREFERRED EMBODIMENT

This invention achieves these objects by providing a fluid volume indicator for tanks having a follower, the position of which is directly proportional to the volume of fluid in the tank and a visible indicator between the follower and a fixed wall, the indicator being movable along the axis of the follower and being acted upon by the two opposed helical compression springs, one between the indicator and the follower and the other one between the indicator and the fixed wall of the tank so that the movement of the indicator is proportional to the movement of the follower. The spring between the follower and the indicator has more turns than the spring between the indicator and the fixed wall but in all other characteristics and dimensions they are the same. In this manner it is possible to indicate large movements of the follower with relatively small indicator movement.

Referring now to the attached drawings there is shown one end of a gas pressure tank 20 and a fluid level follower 1 having disk 2 connected to one end thereof. Follower 1 is adapted to move in a longitudinal direction within the cylindrical extension 3 of tank 20. Disc 2 is in a sealed, slidable engagement within the inner surface of extension 3. Follower 1 is moved by a piston 21 disposed in tank 20 secured by soldering, welding or the like to follower 1 adjacent the other end thereof. Piston 21 is in a sealed, slidable engagement with the inner surface of tank 20 to form a movable wall in tank 20 so that the movement of the follower 1 is proportional to the fluid volume in the tank 20. A tank cover 4 is provided with an axial extension 5 having a bore 22 which is coaxial with the follower 1. One side of the axial extension 5 is cut away to provide a longitudinal viewing slot 7. A glass tube 6 inserted in the bore 22 provides a means for viewing the movement of an indicator 14 within the glass tube 6. The glass tube 6 is held in the extension 5 by means of an annular clamping plate 8 which is fixed to the under side of the cover 4 and a recess 23 formed in fixed end wall 24 of extension 5.

The follower 1 contains a longitudinal bore 9 which is coaxial with the bore 22 in extension 5. A cup-shaped spring support 10 is fitted within bore 9 and attached to the front of disc 2. A guide rod 11 includes on one end thereof disc 16 which is attached to the inner surface of end wall 24 by soldering, welding or the like to thereby secure one end of guide rod 11. Guide rod 11 extends along the length of and coaxial to bores 9 and 22 and is supported in a sliding relationship at the other end thereof by the cup-shaped spring support 10. Indicator 14 in the form of a tube is disposed to encircle guide rod 11 in a coaxial relationship and is movable along rod 11. Indicator 14 includes an inwardly directed end wall portion 15 slidably engaging rod 11, the upper edge of the wall portion 15 providing a reference line 27 for indicator 14. This is only one way a necessary reference line could be provided on indicator 14. The reference line could be in the form of a visible mark at any point along the outer surface of indicator 14 in registry with slot 7. A first helical spring 12 acts between the spring support 10 and one side of wall portion 15 and a second helical spring 13, which is similar to the spring 12 except for being much shorter, acts between the other side of wall portion 15 and disc 16. Except for the number of turns, the springs 12 and 13 are identical in characteristics and dimensions.

A cross bore 17 in the follower 1 and the opening 18 in the spring support 10 connect the chambers 25 and 26 to the interior of tank 20.

The surface 19 on the cover extension 5 is provided with graduations which together with reference line 27 on indicator 14 provides an indication of the volume of fluid within the tank 20.

As the volume of fluid within the tank changes, the follower 1 moves in an axial direction. The indicator 14, which is trapped between the springs 12 and 13, moves in proportion to the movement of the follower 1. However, due to the fact that the spring 12 has more turns than the spring 13, the movement of the indicator 14 is much less than the movement of the follower 1.

The movement of the indicator 14 and, hence, reference line 27 is visible through glass tube 6 and may be measured by means of the calibrated scale on the surface 19.

We claim as our invention:

1. A volume indicator for a fluid tank comprising a first longitudinal extension of said tank extending along a given axis;

a follower disposed coaxially of said given axis within said first extension and extending into said tank to enable said follower to be moved along said given axis by the fluid content of said tank, the position of said follower being directly proportional to the volume of fluid in said tank;

a first longitudinal bore disposed within said follower coaxially of said given axis;

a cup-shaped support disposed within said first bore coaxially of said given axis and secured to one end of said follower;

a cover for said first extension, said cover including a second longitudinal extension disposed coaxially of said given axis, said second extension including a second longitudinal bore disposed within said second extension coaxially of said given axis and aligned with said first bore;

a rod disposed coaxially of said given axis extending from a fixed end wall of said second extension through said second bore into said first bore to a position beyond said cup-shaped support, said rod being supported by said fixed end wall and said cup-shaped support;

a glass tube disposed coaxially of said given axis in said second bore encircling said rod but radially spaced from said rod;

an indicator in the form of a tube disposed coaxially of said given axis in said second bore between said rod and said glass tube, said indicator including an inwardly turned end wall slidably engaging said rod and a reference line;

a longitudinal slot formed in said second extension to expose said indicator and said reference line through said glass tube;

a first spring disposed coaxially of said given axis and encircling said rod extending from said cup-shaped support to the adjacent side of said inwardly turned end wall;

a second spring disposed coaxially of said given axis and encircling said rod extending from said fixed end wall to the adjacent side of said inwardly turned end wall; and a calibrated scale disposed adjacent said longitudinal slot which together with said reference line indicates the volume of the fluid within said tank;

said indicator being moved proportional to the movement of said follower by the cooperative arrangement of said follower, said fixed end wall, said cup-shaped support and said first and second springs.

2. A volume indicator according to claim 1, wherein said first and second springs are each a helical compression spring.

3. A volume indicator according to claim 1, wherein the number of turns and the length of said first spring is greater than the number of turns and the length of said second spring and all other dimensions and characteristics of said first and second springs are the same.

4. A volume indicator according to claim 1, wherein said follower includes a piston connected to that end of said follower disposed in said tank and in a slidably sealed relation with the inner wall of said tank to enable said follower to be moved by the fluid content of said tank.

5. A volume indicator according to claim 1, wherein said glass tube is held in said second extension by means of a recess in the inner surface of said fixed end wall holding one end of said glass tube and an annular clamping plate secured to said cover adjacent the end of said first extension and holding the other end of said glass tube.

6. A volume indicator according to claim 1, further including a radial bore disposed in said follower adjacent the end thereof within said tank between said first bore and said tank, and an aperture in said cup-shaped support to provide fluid communication between said tank, said first bore and said second bore.

7. A volume indicator according to claim 1, wherein said follower includes a disc extending radially from an end of said follower adjacent said cover in a slidable relationship with the inner surface of said first extension; and said cup-shaped support is secured to a transverse surface of said disc adjacent said cover and extending along said given axis toward said tank.

* * * * *